United States Patent
Vanderveen et al.

(10) Patent No.: US 9,674,649 B2
(45) Date of Patent: Jun. 6, 2017

(54) METHODS AND APPARATUS FOR PROVIDING LOCATION INFORMATION WITH PRIVATE EXPRESSIONS

(71) Applicant: QUALCOMM Incorporated, San Diego, CA (US)

(72) Inventors: Michaela Vanderveen, Tracy, CA (US); Saurabha Rangrao Tavildar, Jersey City, NJ (US); Richard R. Hovey, Branchburg, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/741,092

(22) Filed: Jan. 14, 2013

(65) Prior Publication Data

US 2014/0198719 A1    Jul. 17, 2014

(51) Int. Cl.
*H04W 4/02*    (2009.01)
*H04L 29/08*   (2006.01)
(Continued)

(52) U.S. Cl.
CPC ............ *H04W 4/02* (2013.01); *H04L 67/16* (2013.01); *H04L 63/0428* (2013.01);
(Continued)

(58) Field of Classification Search
CPC ... H04L 67/104; H04L 67/1063; H04L 63/08; H04L 67/1065; H04L 67/16;
(Continued)

(56) References Cited

U.S. PATENT DOCUMENTS 5,761,311 A    6/1998  Spelman et al.
7,079,950 B2   7/2006  Sakata et al.
(Continued)

FOREIGN PATENT DOCUMENTS

EP    1990976 A1    11/2008
EP    2219163 A1    8/2010
(Continued)

OTHER PUBLICATIONS

International Search Report and Written Opinion—PCT/US2014/010865—ISA/EPO—Jul. 23, 2014.

*Primary Examiner* — Awet Haile
(74) *Attorney, Agent, or Firm* — James K. O'Hare

(57) ABSTRACT

A method, an apparatus, and a computer program product for wireless communication are provided in connection with providing location information with expression information announced in a wireless network. In one example, a UE is equipped with applications that can request announcement of an expression. In an aspect, the expression may be associated with expression information to be announced over the air. In an aspect, the request indicates to provide location information with the expression information during announcement. Further, the UE may be equipped to generate Peer-Discovery (PD) data including the expression information and the location information. In an aspect, the location information may be included along with the expression information in a data section of the announced PD data. Still further, the UE may be equipped to announce the PD data.

56 Claims, 12 Drawing Sheets

(51) Int. Cl.
  *H04L 29/06* (2006.01)
  *H04W 4/00* (2009.01)
  *H04W 4/06* (2009.01)
  *H04W 12/02* (2009.01)
  *H04W 76/02* (2009.01)
  *H04W 8/00* (2009.01)

(52) U.S. Cl.
  CPC ............ *H04L 69/04* (2013.01); *H04W 4/008* (2013.01); *H04W 4/025* (2013.01); *H04W 4/06* (2013.01); *H04W 8/005* (2013.01); *H04W 12/02* (2013.01); *H04W 76/023* (2013.01)

(58) Field of Classification Search
  CPC .. H04L 29/08306; H04W 4/02; H04W 4/021; H04W 8/005; H04W 84/18; H04W 48/16; H04W 4/028
  See application file for complete search history.

(56) References Cited

U.S. PATENT DOCUMENTS

| | | | |
|---|---|---|---|
| 8,331,958 | B2 | 12/2012 | Hein et al. |
| 2003/0050755 | A1* | 3/2003 | Sakata et al. ................. 701/210 |
| 2005/0036612 | A1 | 2/2005 | Shiina |
| 2009/0112537 | A1 | 4/2009 | Okumura |
| 2010/0190468 | A1 | 7/2010 | Scott et al. |
| 2010/0246502 | A1 | 9/2010 | Gong et al. |
| 2011/0216753 | A1* | 9/2011 | Kneckt et al. ................ 370/338 |
| 2013/0036238 | A1* | 2/2013 | Chowdhary et al. .......... 709/247 |
| 2014/0002301 | A1* | 1/2014 | Park et al. ................ 342/357.31 |
| 2014/0114567 | A1* | 4/2014 | Buchanan et al. ............ 701/454 |

FOREIGN PATENT DOCUMENTS

| | | |
|---|---|---|
| JP | 2001251662 A | 9/2001 |
| WO | WO-9607110 A1 | 3/1996 |

* cited by examiner

METHODS AND APPARATUS FOR PROVIDING LOCATION INFORMATION WITH PRIVATE EXPRESSIONS

BACKGROUND

Field

The present disclosure relates generally to communication systems, and more particularly, to providing location information with private expressions for device to device (D2D) communications in a wireless communications based network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (D2D) communication.

Currently, many devices (e.g., user equipments (UEs)) may be operable in a cellular network. The D2D feature of LTE may provide for communications between UEs that are in direct communication range. UEs may use expressions to announce various attributes (user or service identities, application features, interests, location, etc.) as driven by proximity-aware applications. Expressions may be public—when they are accessible to any UEs within range of the announcing UE, or private—when access is limited to only certain UEs that have been authorized in advance. When using private expressions, an announcing UE may have provided (e.g., via an offline process) a corresponding expression-code to the one or more monitoring UEs that have been granted permission to access/decode the announced expression when in proximity.

Generally, expressions may be announced in a broadcast fashion on licensed spectrum. These announcements are size-constrained, in order to accommodate a large number of such announcing devices sharing the licensed spectrum with regular 3G/4G communications. By detecting an expression, a receiver device is able to determine that another device is somewhere nearby. But due to the limited size and content of current expression announcement, the receiver device does not know much else about the announcing UE. For example, received signal strength may provide relative distance information (e.g., whether the announcing UE is further away (geographically) or closer by), but this information is not very reliable as channel conditions vary and may be dependent on other factors.

As the demand for D2D communication increases, there exists a need for methods/apparatuses for efficiently providing location information with expression announcements in wireless communications based networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing location information with expression information announced in a wireless network. In one example, a UE is equipped with applications that can request announcement of an expression. In an aspect, the expression may be associated with expression information to be announced over the air. In an aspect, the request may include an indication to provide location information with the expression information during announcement. Further, the UE may be equipped to generate Peer-Discovery (PD) information including the expression information and the location information. In an aspect, the location information may be included along with the expression information in a data section of the announced PD information. Still further, the UE may be equipped to announce the PD information. In another example, a UE may be equipped to receive PD information, determine that the PD information includes expression information and location information, and extract the expression information and the location information from the PD information.

According to a related aspect, a method for providing location information with expression information in a wireless network is provided. The method can include receiving, from an application, a request to announce an expression. In an aspect, the expression may be associated with expression information to be announced over the air. In an aspect, the request may include an indication to provide location information with the expression information during announcement. Further, the method can include generating PD information including the expression information and the location information. In an aspect, the location information may be included along with the expression information in a data section of the PD information. Moreover, the method may include announcing the PD information.

Another aspect relates to a communications apparatus configured to provide location information with expression information in a wireless network. The communications apparatus can include means for receiving, from an application, a request to announce an expression. In an aspect, the expression may be associated with expression information to be announced over the air. In an aspect, the request may include an indication to provide location information with the expression information during announcement. Further, the communications apparatus can include means for generating PD information including the expression information and the location information. In an aspect, the location information may be included along with the expression information in a data section of the PD information. Moreover, the communications apparatus can include means for announcing the PD information.

Another aspect relates to a communications apparatus. The apparatus can include a processing system configured to receive, from an application, a request to announce an expression. In an aspect, the expression may be associated with expression information to be announced over the air. In an aspect, the request may include an indication to provide location information with the expression information during announcement. Further, the processing system may be configured to generate PD information including the expression information and the location information. In an aspect, the location information may be included along with the expression information in a data section of the PD information. Moreover, the processing system may further be configured to announce the PD information.

Still another aspect relates to a computer program product, which can have a computer-readable medium including code for receiving, from an application, a request to announce an expression. In an aspect, the expression may be associated with expression information to be announced over the air. In an aspect, the request may include an indication to provide location information with the expression information during announcement. Further, the computer-readable medium can include code for generating PD information including the expression information and the location information. In an aspect, the location information may be included along with the expression information in a data section of the PD information. Moreover, the computer-readable medium can include code for announcing the PD information.

According to another related aspect, a method for providing location information with expression information in a wireless network is provided. The method can include receiving PD information from an announcing UE. Further, the method can include determining that the PD information includes expression information and location information. Moreover, the method may include extracting the expression information and the location information from the PD information.

Another aspect relates to a communications apparatus configured to provide location information with expression information in a wireless network. The communications apparatus can include means for receiving PD information from an announcing UE. Further, the communications apparatus can include means for determining that the PD information includes expression information and location information. Moreover, the communications apparatus can include means for extracting the expression information and the location information from the PD information.

Another aspect relates to a communications apparatus. The apparatus can include a processing system configured to receive PD information from an announcing UE. Further, the processing system may be configured to determine that the PD information includes expression information and location information. Moreover, the processing system may further be configured to extract the expression information and the location information from the PD information.

Still another aspect relates to a computer program product, which can have a computer-readable medium including code for receiving PD information from an announcing UE. Further, the computer-readable medium can include code for determining that the PD information includes expression information and location information. Moreover, the computer-readable medium can include code for extracting the expression information and the location information from the PD information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
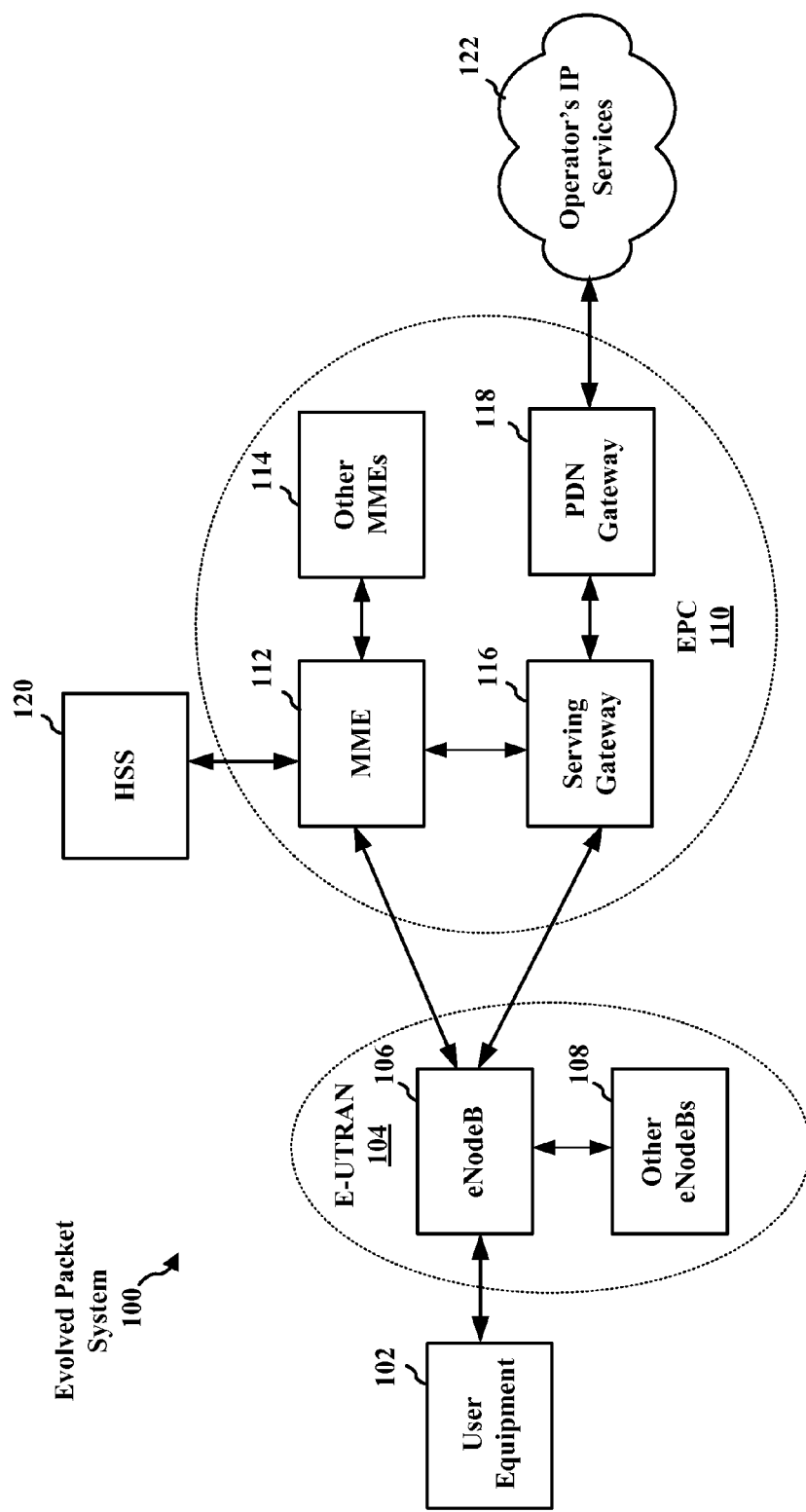
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
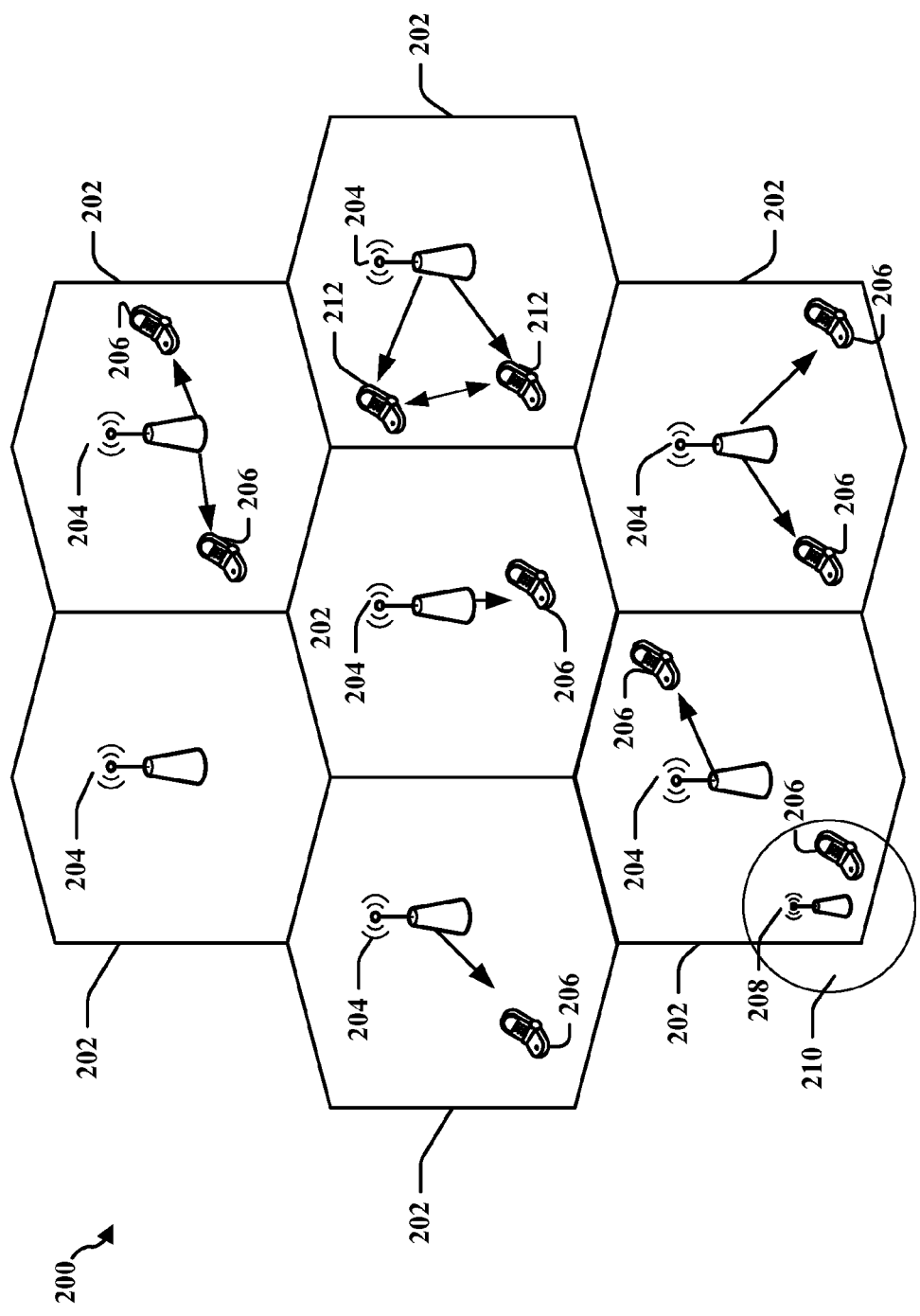
FIG. 2 is a diagram illustrating an example of an access network.

FIG. 2 is a diagram illustrating an example of an access network 200 in a LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
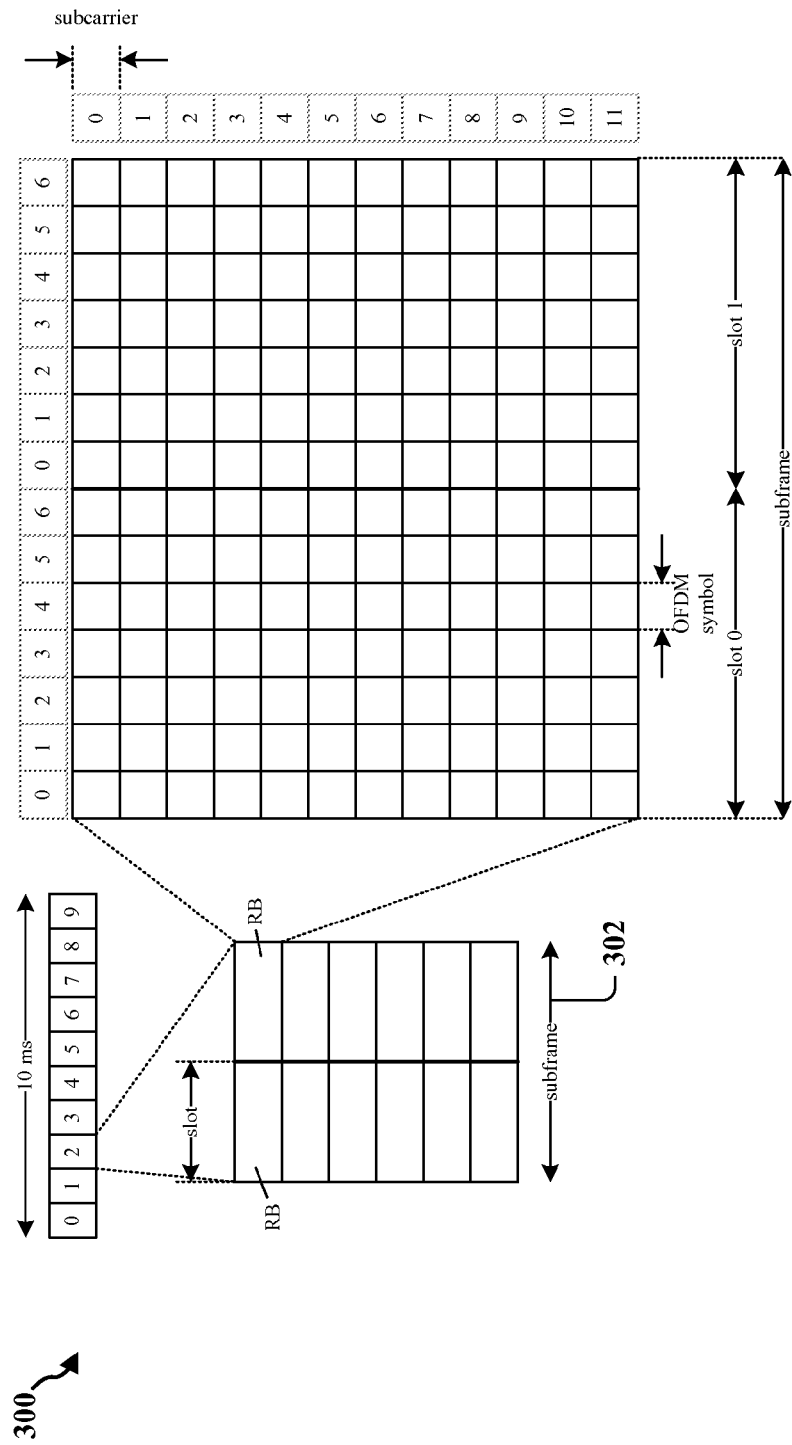
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame 302 may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
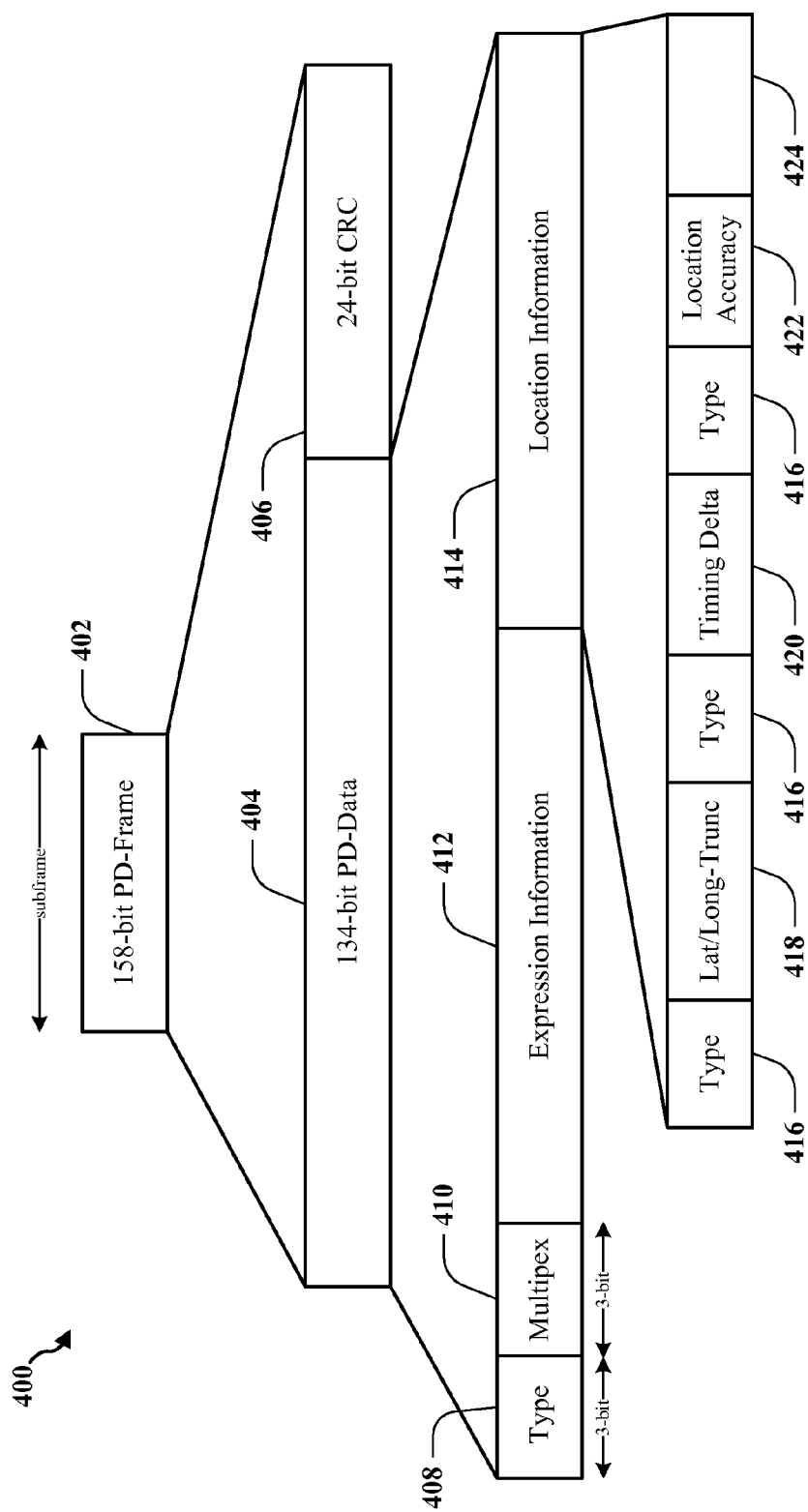
FIG. 4 is a diagram illustrating an example of an expression frame structure, according to an aspect.

FIG. 4 is a diagram 400 illustrating an example of an expression frame 402 structure, according to an aspect. An expression frame 402 span a subframe in duration (e.g., subframe 302). In an aspect, the expression frame 402 may be 158 bits. Further, expression frame 402 may include a peer discover (PD) data portion 404 (e.g., 134-bit PD-data) and a cyclic redundancy check (CRC) portion 406 (e.g., 24-bit CRC). Further, the PD-data portion 404 may include a header with type 408 and multiplexing information 410. In an aspect, each of the type 408 and multiplexing 410 sub-portions may use 3 bits. Further, PD-data portion 404 may include expression information 412 and location information 414. In an aspect, the expression information may be a private expression (e.g., 64-bits) or a public expression. In an aspect, the presence of the location information 414 in the PD-data portion 404 may be signaled in a field in the type 408/multiplexing 410 information. Further, where the expression in encrypted to provide additional secrecy (e.g., a private expression), separate encoders may be used for the expression information 412 and the location information 414. Further discussion on an encoding process is described with reference to FIG. 8.

In an operational aspect, the location information 414 may be formatted as provided in Table 1.

TABLE 1

Type-value chained format 64-bit field for location information

| Type | Field Name | Length (bits) | Notes |
| --- | --- | --- | --- |
| 1 | Lat/Long- Truncated | 32 | Encoding as in 3GPP TS23.032, but truncated |
| 2 | Timing delta | 4 | Encoding: enumeration of: obtained within last 30 s, 1 min, 5 min, 15 min, 1 hr, etc.. |
| 3 | Location Accuracy | 4 | Reflects source (A-GNSS, WiFi location, OTDOA, E-CID). Encoding: enumeration of: within 5 m, 10 m, 20 m, etc. |
| 4 | Venue group/type | 8 | Encoding as in IEEE 802.11u spec. Can be copied from nearby HS2.0 Access Point beacon. |
| 5 | Velocity | 2 | Encoding: enumeration of: stationary, walking, running, car/train |
| 6 | Altitude indication | 4 | Meters, number of floors with respect to the ground floor, etc. Encoding: enumeration of: 1, 2, 3, etc. floors below ground; 1, 2, 4, 6, 10 floors above ground level, etc. |

In an aspect that uses the formatting provided in Table 1, the location information 414 may be formatted with a 4-bit type block 416 indicating truncated latitude longitude data 418, followed by type block 416 indicating timing delta information 420, followed by type block 416 indicating location accuracy information 422, with further space 424 available for other types of location information.

In an operational aspect, as peer discovery may occur over a relatively small area, latitude and longitude information 418 may be truncated by the announcing device and inferred by the receiving device. For example, where a maximum peer discovery range is 10 km, the value approximately equates to 0.09 degrees. A large portion of the latitude-longitude information 418 describing a location is common between devices within 10 kms of each other. As such, the full latitude-longitude information 418 may be truncated so as to fit with 32-bits.

As noted in Table 1, location accuracy 422 may be enumeration as distances (e.g., 5 m, 10 m, 20 m, etc.) within a shape (e.g., circle, ellipsoid, polygon, etc.) of the announcing device location.

Figure 5:
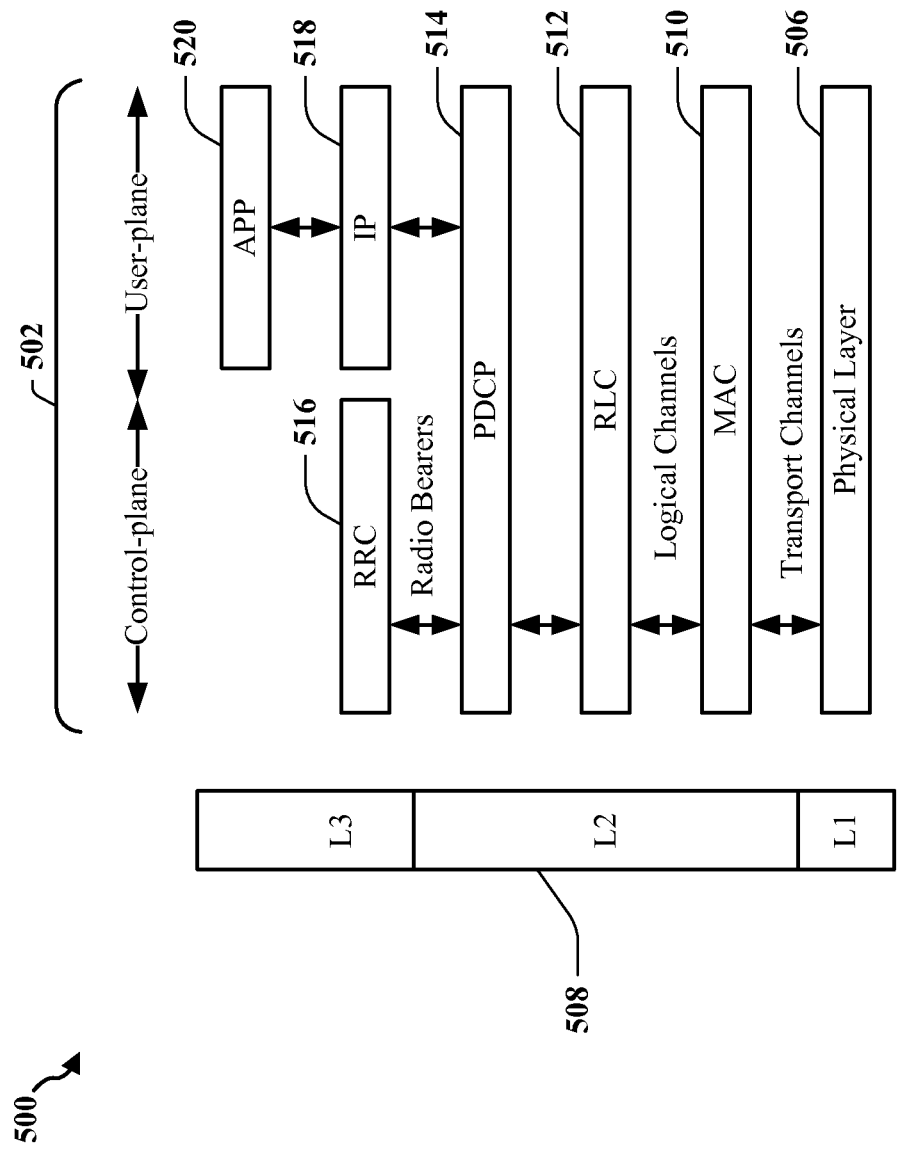
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the eNB is shown with three layers: Layer 1, Layer 2, and Layer 3. Communication 522 of data/signaling may occur between UE 502 and eNB 504 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE 502. The user plane also includes an internet protocol (IP) sublayer 518 and an application sublayer 520. The IP sublayer 518 and application sublayer 520 are responsible for supporting communication of application data between the eNB 504 and the UE 502.

Figure 6:
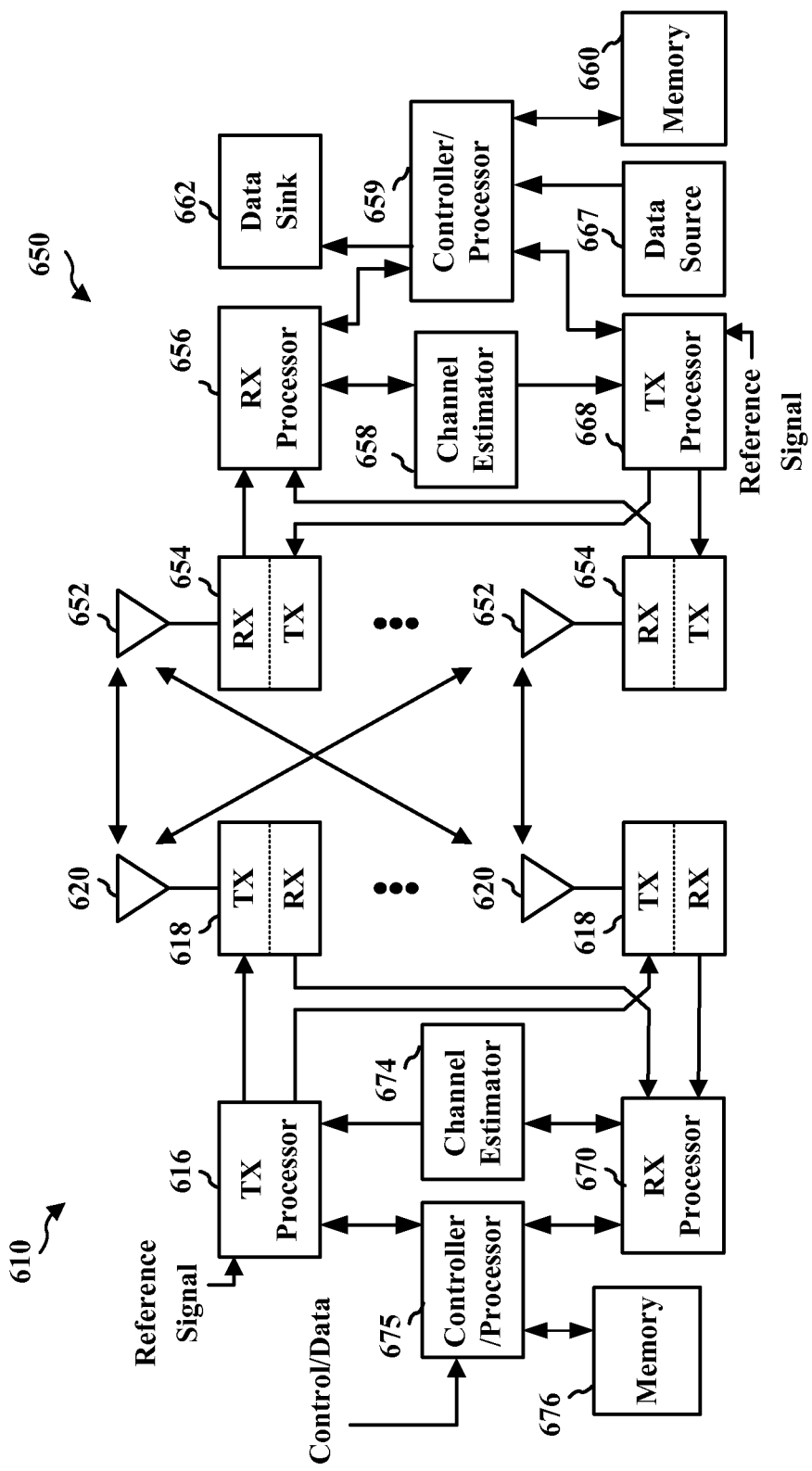
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
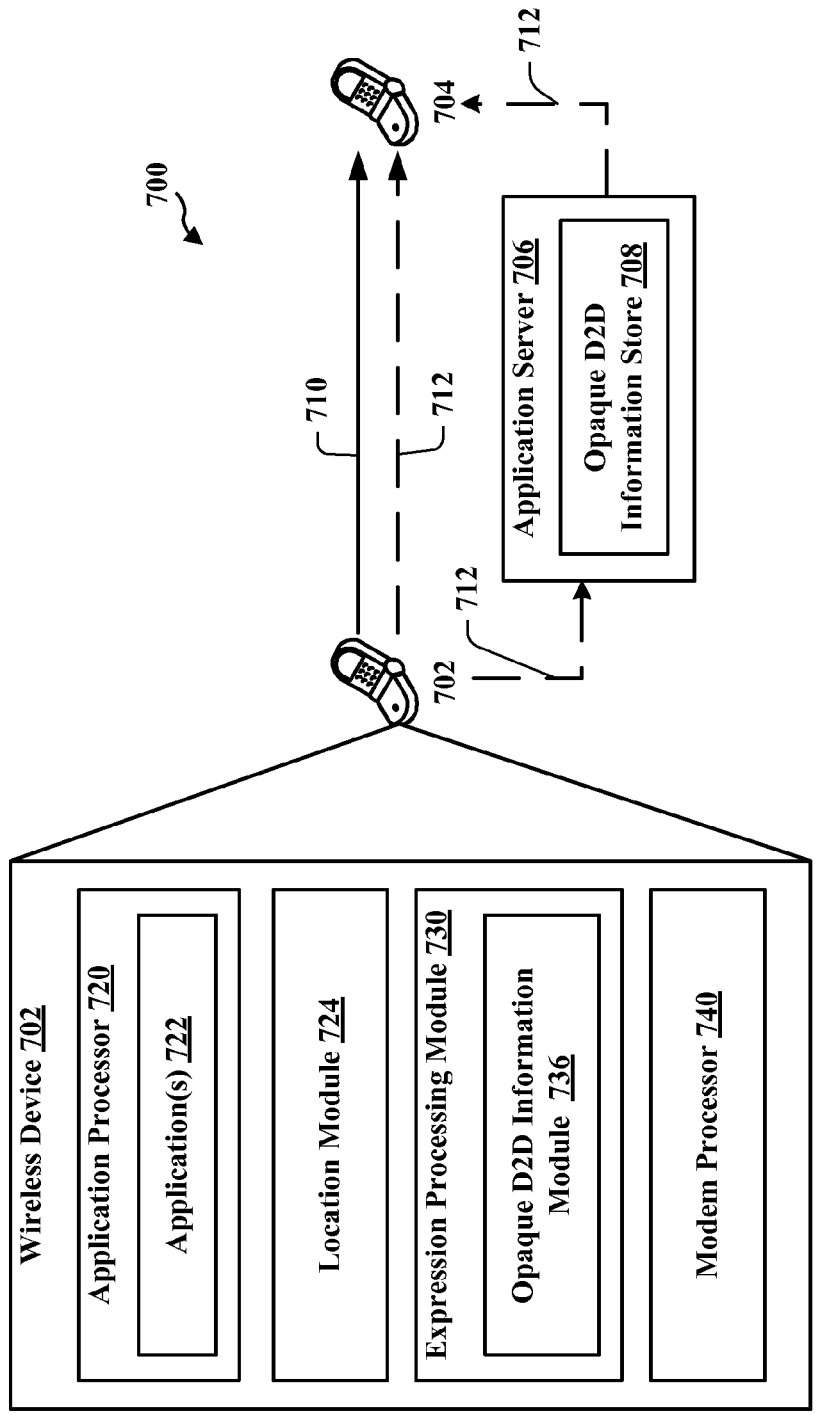
FIG. 7 is a diagram illustrating a device-to-device communications network.

FIG. 7 is a diagram of a device-to-device communications system 700. The device-to-device communications system 700 includes a plurality of wireless devices 702, 704. In an optional aspect, device-to-device communications system 700 may also include application server 706 operable to communicate with one or more of the wireless devices 702, 704.

The device-to-device communications system 700 may overlap with a cellular communications system, such as for example, a wireless wide area network (WWAN). Some of the wireless devices 702, 704 may communicate together in device-to-device communication using the DL/UL WWAN spectrum and/or unlicensed spectrum (e.g., WiFi), some may communicate with a base station, and some may do both. In another aspect, the WWAN may include multiple base stations that may provide a coordinated communications environment through connectivity provided via one or more network entities (e.g., MMEs, etc.).

Wireless device 702 may include, among other components, an application processor 720, a location module 724, expression processing module 730, and a modem processor 740. In an aspect, application processor 720 may be configured to enable one or more applications 722. In such an aspect, an application 722 may request that location information be included with an expression 710 for announcement to one or more other peer devices (e.g., wireless device 704). In other words, an announcing application programming interface (API) allows location information, with a given accuracy, to be included with an expression. Further, the API allows for location information (coordinates, timestamp, accuracy, etc.) monitoring. In an aspect, the API may be configured such that when the wireless device 702 is monitoring for PD data from other wireless device (e.g., 704), the monitoring may include monitoring for an indication that the PD data includes location information with expression information.

Location module 724 may be configured to determine a device location based on one or more wireless device 702 sensors (e.g., GPS), measurements, etc. In an aspect, location module 724 may process the location information for inclusion with an expression in an expression-code 710. For example, location module 724 may generate truncated longitude/latitude information based on global navigation satellite system (GNSS) measurements.

Expression processing module 730 may include opaque D2D information module 736. In an aspect, processing module 730 may generate a PD data 710 including expression information and location information. In an aspect, the location information, from location module 724, may be included after the expression information in a data section of the PD data 710. In an aspect in which the expression information is a private expression and/or where the announcing wireless device 702 decides to limit availability of the location information, expression processing module 730 may encode the expression information and location information using different secret codes. In such an aspect, a one-way time-varying encoder function may be used for each of the expression information and the location information. Opaque D2D information module 736 may generate and provide opaque D2D information 712 to one or more peer devices 704 and/or an application server 706. The opaque D2D information 712 may include the parameters (e.g., expression-code, keys, etc.) that allow authorized peer devices 704 to receive and decode the expression information and/or the location information.

In an operational aspect, as part of an application 722 configuration/reconfiguration process, opaque D2D information module 736 may assist wireless device 702 in generating opaque D2D information 712 relating to expression information that the application intends for the modem 740 to announce. In an aspect, opaque D2D information 712 may be transmitted directly (e.g., without use an intermediary entity such as the application server 706) and securely to an authorized wireless device 704. In an aspect, the transmission of the opaque D2D information may be facilitated through one or more protocols, such as but not limited to, FlashLinQ, WiMedia, Bluetooth, ZigBee, Near Field Communication (NFC), Wi-Fi/WiFi-Direct based on the IEEE 802.11 standard, etc. In another aspect, opaque D2D information 712 may be communicated to application server 706 for storage in an opaque D2D information store 708 and communicated to one or more authorized wireless devices 704. In an aspect, the opaque D2D information 712 may include the expression name, discovery expression-code or keys, location expression-code or keys, a name of the application 722, a counter, a time of generation, previously generated expression-code(s), an expiration date, a certificate of the announcing wireless device 702, etc. In another aspect, the opaque D2D information 712 may be signed with a digital signature indicating authenticity of the opaque D2D information 712. In such an aspect, the digital signature may include an operator signed key, a device identifier, a TTL or validity period, etc.

Further, although FIG. 7 depicts expression processing module 730 as a separate module from application processor 720 and modem processor 740, the expression processing module 730 may reside in the application processor 720, in the modem processor 740, or any combination thereof. Further, in an aspect, the expression processing module 730 may act as an interface between the application processor 720 and the modem processor 740. In another aspect, a first portion of the expression processing module 730 may be associated with a modem processor 740, and a second portion of the expression processing module 730 may be configured as an intermediary layer between an application processor 720 and the modem processor 740. In another aspect, Opaque D2D information module 736 may store information (e.g., opaque D2D information 712) from other devices 704. In such an aspect, received opaque D2D information may have a time to live (TTL) value. In another aspect, the TTL value may be locally generated. Modem processor 740 may be configured to receive and transmit information using one or more radio access technologies (RATs).

Application server 706 may be configured to store information associated with PD data communication, such as opaque D2D information 712, in opaque D2D information store 708. In an aspect, application server 706 may adhere to user-selected relations when distributing opaque D2D information 712 to applications 722 on wireless devices (e.g., 702, 704).

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, NFC or Wi-Fi/ WiFi-Direct based on the IEEE 802.11 standard. To simplify the discussion, the exemplary methods and apparatus are discussed within the context of LTE. However, one of ordinary skill in the art would understand that the example methods and apparatuses are applicable more generally to a variety of other wireless device-to-device communication systems operating in licensed and/or unlicensed spectra.

Figure 8:
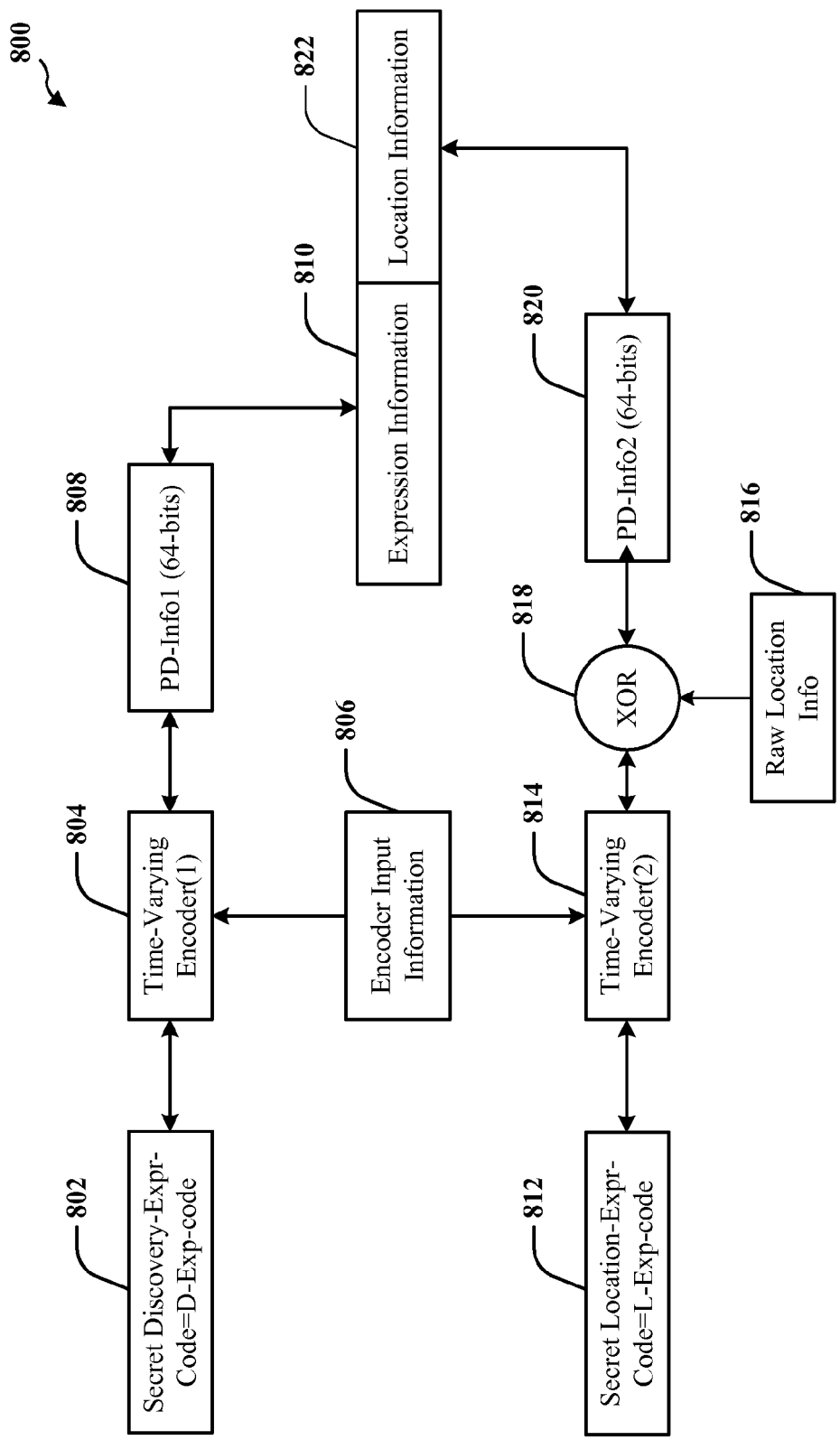
FIG. 8 is a diagram illustrating an example block diagram for expression processing, according to an aspect.

FIG. 8 is a diagram 800 illustrating an example block diagram for expression processing, according to an aspect.

An expression processing system 800 (e.g., expression processing module 730), may include two processing chains. A first processing chain for processing a private expression portion of PD information (e.g., expression information 412), and a second processing chain for processing a location information portion of PD information (e.g., location information 414). In an aspect, two or more secret-codes may be generated/used to process the private expression and the location information. For example, a first secret-code (e.g., a discovery expression-code) may be used with the private expression, while a second secret-code (a location expression-code) may be used with the location information. In another aspect, an additional non-secret expression-code may be generated to be provided to a domain name server (DNS) to allow others to look up the UE in the DNS while not being able to determine the other (secret) expression-codes.

For an announcing device, (e.g., device 702), and with respect to the private expression processing chain, the discovery expression-code may be used as such or derived from the private expression and a first key in block 802. Encoder input information 806 may then be combined with the discovery expression-code using a first time varying encoder 804 to generate a first PD-information 808 to be included in the private expression information 810 portion.

In an aspect, encoder input information 806 may include a discovery region/area identifier, a peer discovery channel resource identifier (DRID), a LTE-time value, etc. In an aspect, the LTE-time value may be 19-bits long and may count LTE radio frames (e.g., a 10 ms accuracy). Further, as maximum time difference between the instant a location fix is read and the expression is actually sent in the PD interval can exceed PD periodicity (e.g., 20 seconds long), the modem may keep track of times that location information (e.g., GNSS) is read, and may compute a drift between the time of the location fix reading and the time of transmission, and send this information in the PD location information portion (e.g., 414). In another aspect, a number of bits (e.g., more than 5) may be used to signal the number of seconds that have elapsed since the location fix was obtained (e.g., a timing-delta as referred to in the Table 1).

For an announcing device, (e.g., device 702), and with respect to the location information processing chain, the location expression-code may be used as such or derived from the private expression and a second key, in block 812. Encoder input information 806 may then be combined with the location expression-code using a second time varying encoder 814. Further, the encoded location information may be XORed 818 with raw location information 816 to generate a second portion PD-information 820 to be included in the location information 820 portion. In an aspect, use of the second time-varying encoder 814 followed by the XOR 818 with the raw location information 816 preserves the structure of the location information 822, thereby allowing a receiving device to decrypt the location information without prior knowledge of it.

Figure 9:
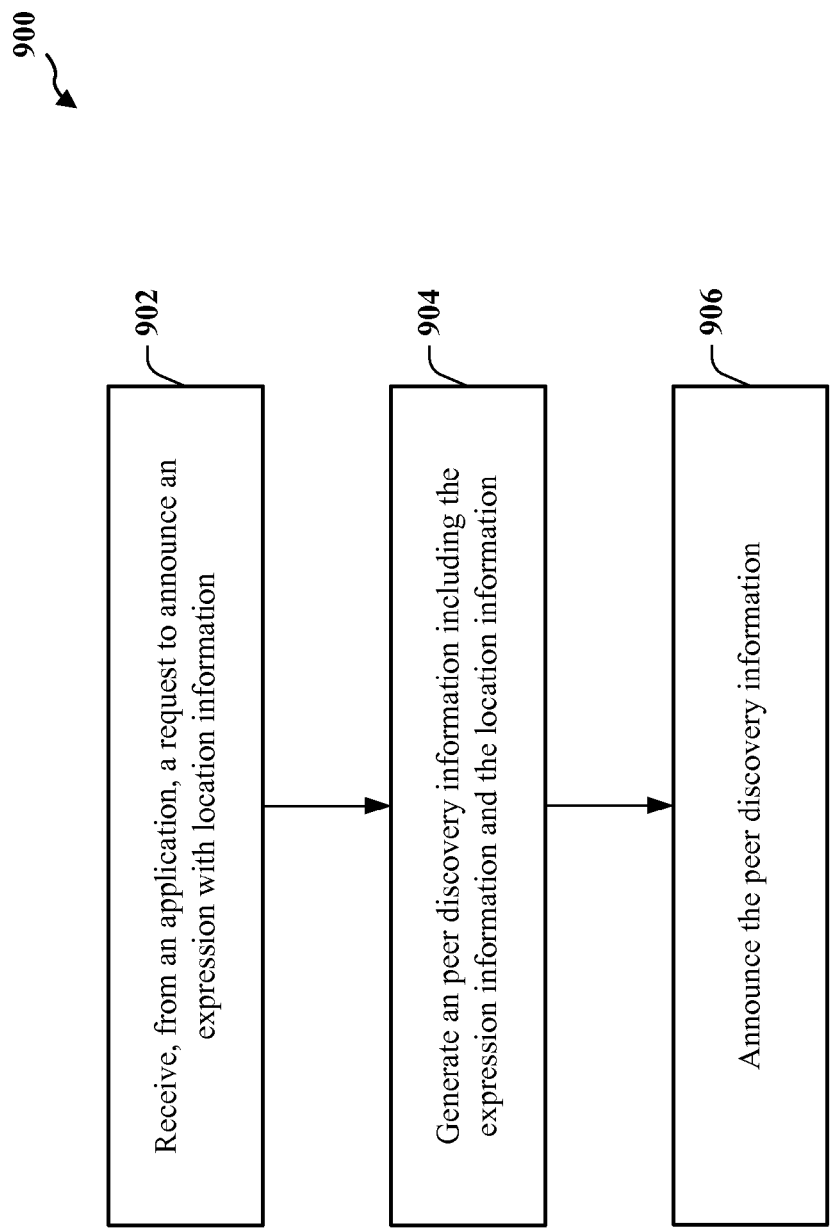
FIG. 9 is a flow chart of a method of wireless communication.
Figure 10:
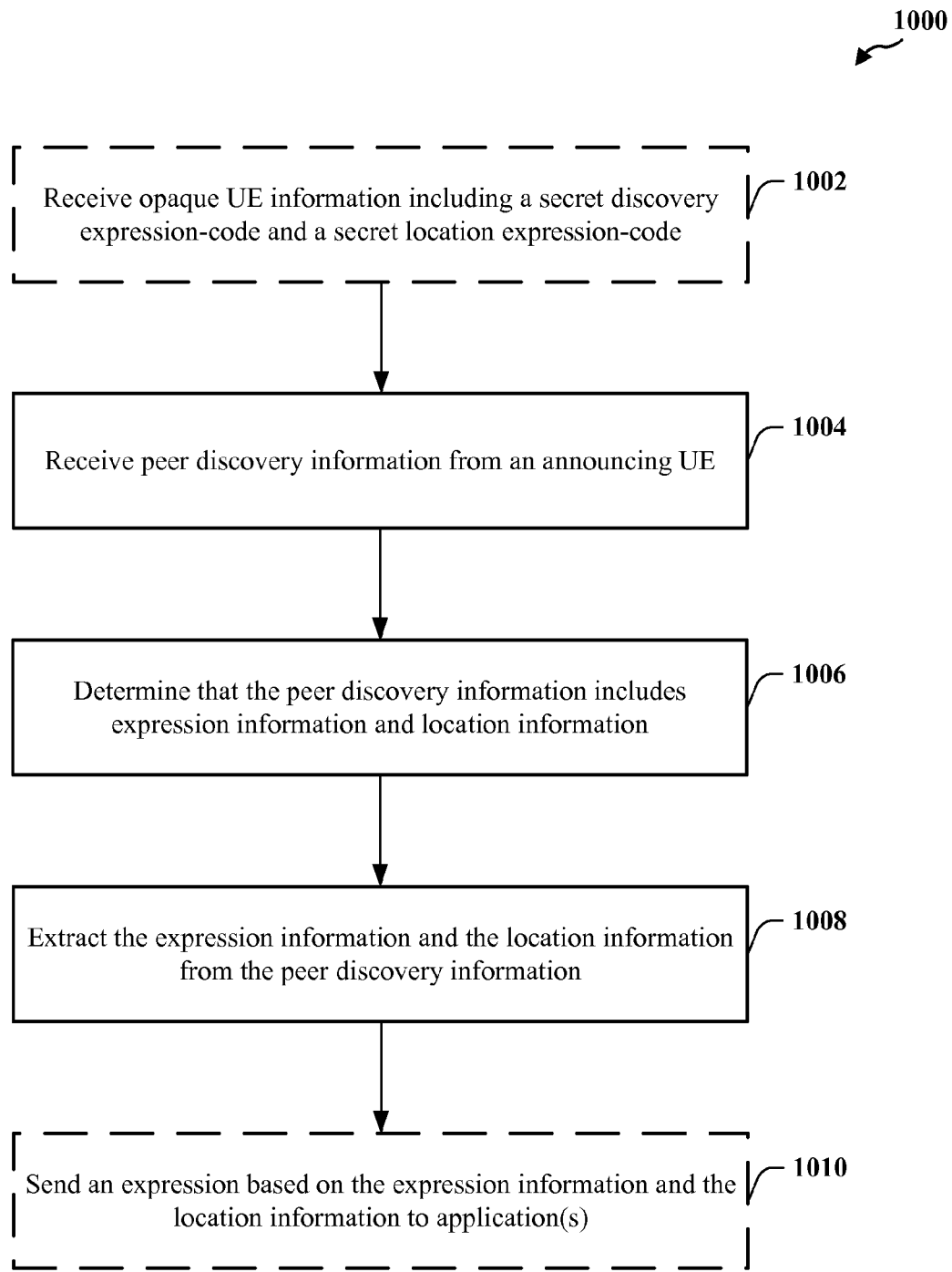
FIG. 10 is a flow chart of another method of wireless communication.

FIGS. 9 and 10 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 depicts an example flowchart describing a process 900 for including location information with expression information in PD information, according to an aspect. In an aspect, the process 900 may be performed by an intermediary layer module associated with a wireless device, a modem associated with the wireless device, etc.

At block 902, a request to announce an expression may be received from an application. In an aspect, the expression is associated with expression information to be announced over the air. In an aspect, the request may include an indication to include location information with the expression information during announcement. In an aspect, the expression information may include a user identity, a service, an affiliation, a desire, etc. In another aspect, the location information may be interpreted as the geographical location of the device that announces that particular expression. For example, the expression information may announce a mobile dog grooming service, and the location information may indicate the approximate geographical coordinates of that device.

At Block 904, a Component (e.g., Modem, Expression Processing Module, Etc.) associated with the announcer wireless device may generate PD information including the expression information and the location information. In an aspect, the location information may be included after the expression information in a data section (e.g., PD data 404) of an expression frame (e.g., expression frame 402). In another aspect, an indication that location information is included in the Pd information may be included in a header section (e.g., 408/410) of the expression frame (e.g., expression frame 402). The location information may include any combination of: truncated latitude/longitude/altitude information, timing information, accuracy information, velocity information, venue type, etc. In an aspect, truncated latitude/longitude/altitude information may be included to achieve size savings in the announced expression. In such an aspect, truncation is one way to exploit radio signal constraints (e.g., the announcer UE may not be too far from the receiver UE, and thus both sender and receiver have some common geographical knowledge). Further, the truncation may assure that the difference between the location of the sender and that of any potential receiver is sent, rather than an absolute location. In another aspect, timing information may be used to efficiently indicate the time between when an expression is announced and received, and when the associated location information was actually read. In such an aspect, to achieve savings in size of announced PD information, the difference between the time that the PD information is sent and the time that the location measurement was actually read (at the sender) may be sent. In another aspect, accuracy information and associated confidence may be included with the location information. In such an aspect, the shape of the accuracy location may be omitted (e.g., a circle, ellipsoid, or some other suitable shape may be commonly assumed). In such an aspect, the shape may also take into account the maximum distance of the nearby receivers. In another aspect, a velocity of the announcer UE may be included with the location information (e.g., an enumerated type such as walking, running, car/train, etc.) In such an aspect, the velocity information may be obtained by the modem reading data from the accelerometer or other such collocated sensor. In another aspect, venue type (e.g. stadium, restaurant, etc.) may be included in the location information. In such an aspect, the venue information may be obtained from various sources (e.g., via a local IEEE 802.11 (WLAN) Access Point (AP)). In another aspect, a fixed device (AP) may be equipped to broadcast the venue type of its location. In an aspect, which of the location information components is actually sent with the Pd information can be signaled explicitly (for a receiver to know whether, e.g., venue type is included or not). In an aspect in which the PD information includes a private expression and/or where the announcing UE decides to limit availability of the location information, the expression information and location information may be encoded using secret expression-codes. In such an aspect, a one-way time-varying encoder function may be used for each of the expression information and the location information. Further, the inputs to these functions are the discovery expression-code and the location expression-code, other parameters (such as LTE timing), and the output is the PD information to be sent over the air (OTA). As such, even if an unauthorized device is located very close to the announcer UE or has some other way to guess the location information of the announcer, the unauthorized device cannot deduce the secret location expression-code from the known/guessed location information and the OTA announced information. This is due to the one-way and time-varying nature of the encoder which ensures that with each announcement, the location information announced OTA looks different (though the location itself may not have changed at all).

At block 906, the expression-code may be announced.

FIG. 10 depicts an example flowchart describing a process 1000 for interpreting location information included with expression information in PD information, according to an aspect. In an aspect, the process 1000 may be performed by an intermediary layer module associated with a wireless device, a modem associated with the wireless device, etc.

In an optional aspect, at block 1002, a UE may receive (e.g., via "out of band" means) opaque private expression-code information from an announcer UE. In such an aspect, the announcer UE may share with authorized UEs a discovery expression-code and/or a location expression-code. For example, the location expression-code may be used to obfuscate the location information from unauthorized users.

At block 1004, the receiver UE may receive PD information from the announcer UE.

At block 1006, the receiver UE may determine that the PD information includes expression information and location information. In an aspect, the location information may be determined to be included in the PD information based on a location information indication in a header section of the PD information. In an aspect, the location information may include truncated latitude and longitude data. In such an aspect, the receiver UE may generate full latitude and longitude data from the truncated latitude and longitude data prior to sending the location information to any applications. In another aspect, the location information may include altitude data. In such an aspect, the altitude data may be provided in building floor increments. In another aspect, the location information may include a time difference value. In such an aspect, timing information may be used to efficiently indicate the time between when an expression is announced and received, and when the associated location information was actually read. In such an aspect, the read time and a reception time may be used to determine the freshness of the location information. In another aspect, the location information may indicate a level of location accuracy (5 m, 100 m, 1 km, etc.). In another aspect, the location information may include venue (e.g., sports stadium, shopping mall, etc.) information.

At block 1008, the receiver UE may extract the expression information and the location information from the PD information. In an aspect in which the expression information is a private expression, the receiver UE may use the discovery expression-code to decode the private expression and the location expression-code to decode the location information. In an aspect, one-way time-varying decoders may be used to decode the private expression information and location information. In an aspect, the extraction of the location information may include pre-processing the location information (e.g., augment the latitude/longitude information to its full length, change its format, etc.) so it can be used by an application employing traditional/existing maps. In such an aspect, the location information may be extracted from the PD information and passed through the time-varying decoder. Thereafter, the location information may be further processed into a form accessible by an application (e.g., generate full longitude/latitude data from received truncated longitude/latitude data, adjust format, etc.).

At block 1010, in an optional aspect, an expression based on the expression information and location information (e.g., an actual expression name and location data as derived from the expression information and location information) may be provided to one or more applications. In an aspect, an application may request to the modem of the receiver UE that detected expression information be passed along with their associated location information.

Figure 11:
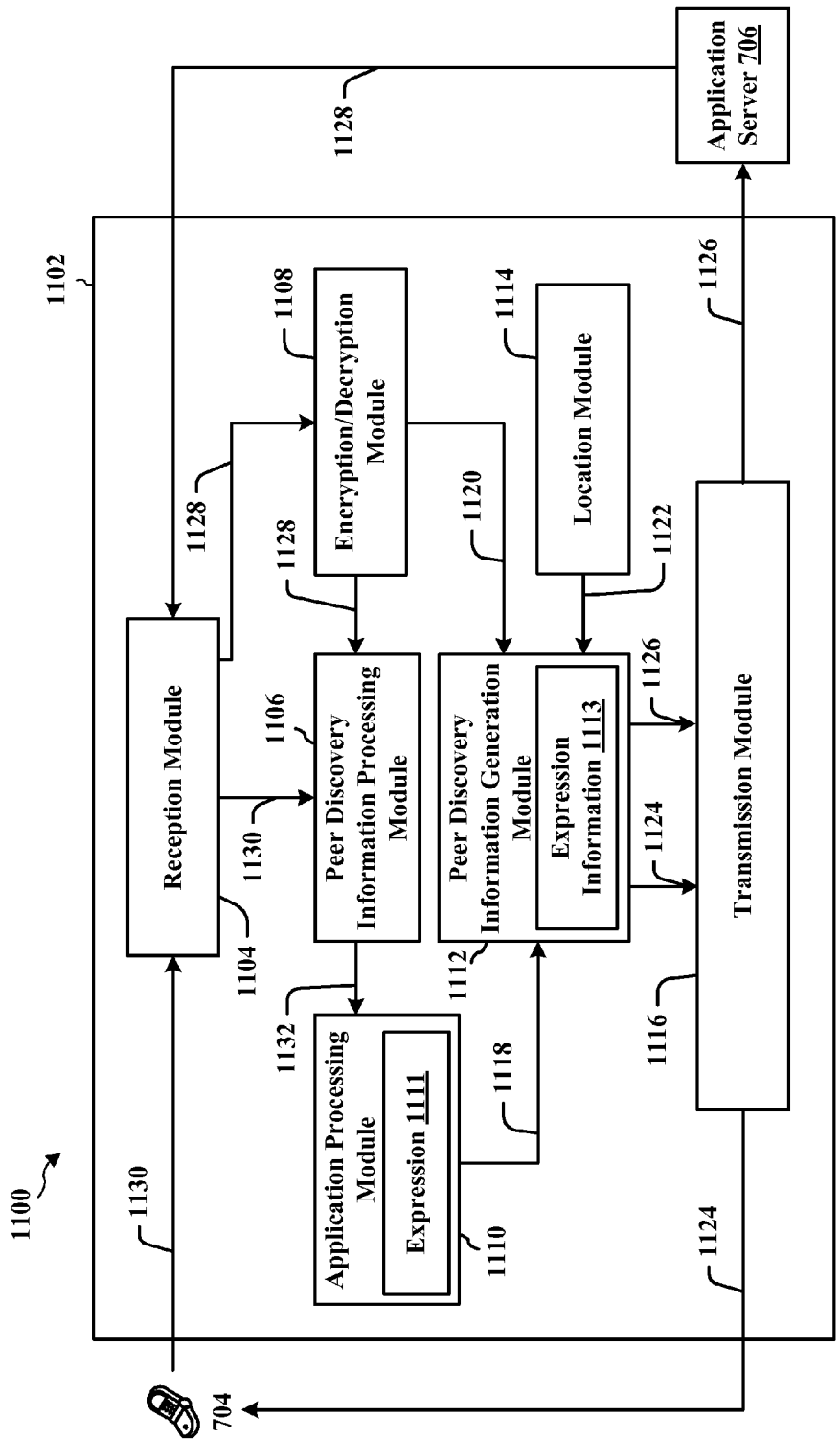
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE.

The apparatus 1102 includes an application processing module 1110 that may receive a request 1118 from an application to announce an expression 1111. In an aspect, the request 1118 may include the expression 1111 and/or reference to the expression 1111 (e.g., an expression name) and an indication to include location information 1122 with the expression 1111. In an aspect, PD information generation module 1112 may receive location information 1122 from location module 1114 and may generate the PD information 1124 including expression information 1113 associated with the expression 1111 and the location information 1122. In an optional aspect, PD information generation module 1112 may receive encryption keys 1120 (e.g., secret discovery expression-code, secret location expression-code, etc.) from encryption/decryption module 1108. In such an aspect, PD information generation module 1112 may use different encryption keys 1120 to encrypt the expression information 1113 and the location information 1122. In another aspect, PD information generation module 1112 may generate opaque D2D information 1126. In an aspect, opaque D2D information 1126 may be transmitted, using transmission module 1116, directly to an authorized wireless device 704. In another aspect, opaque D2D information 1126 may be communicated, using transmission module 1116, to application server 706 for storage and communication to one or more authorized wireless devices 704. In an aspect, the opaque D2D information 1126 may include the expression name, discovery expression-code or keys, location expression-code or keys, a name of the application, a counter, a time of generation, previously generated expression-code(s), an expiration date, a certificate of the announcing wireless device 1102, etc. Further, the apparatus 1102 may announce the PD information 1124 including the expression information 1113 and the location information 1122 using transmission module 1116.

Further, apparatus 1102 may receive opaque D2D information 1128, using reception module 1104. In an aspect in which opaque D2D information 1128 includes discovery expression-code or keys and/or location expression-code or keys, the opaque D2D information 1128 may be provided to encryption/decryption module 1108. Further, apparatus 1102 may receive, using reception module 1104, PD information 1130 from a peer device 704. PD information processing module 1106 may process the received PD information 1130 (optionally using expression-codes/keys 1128 from encryption/decryption module 1108) and may provide the information 1132 based on the expression information 1113 and accompanying location information 1112 to application processing module 1110 to use by one or more applications.

The apparatus may include additional modules that perform each of the steps of the algorithm in the aforementioned flow charts of FIGS. 9 and 10. As such, each step in the aforementioned flow charts of FIGS. 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
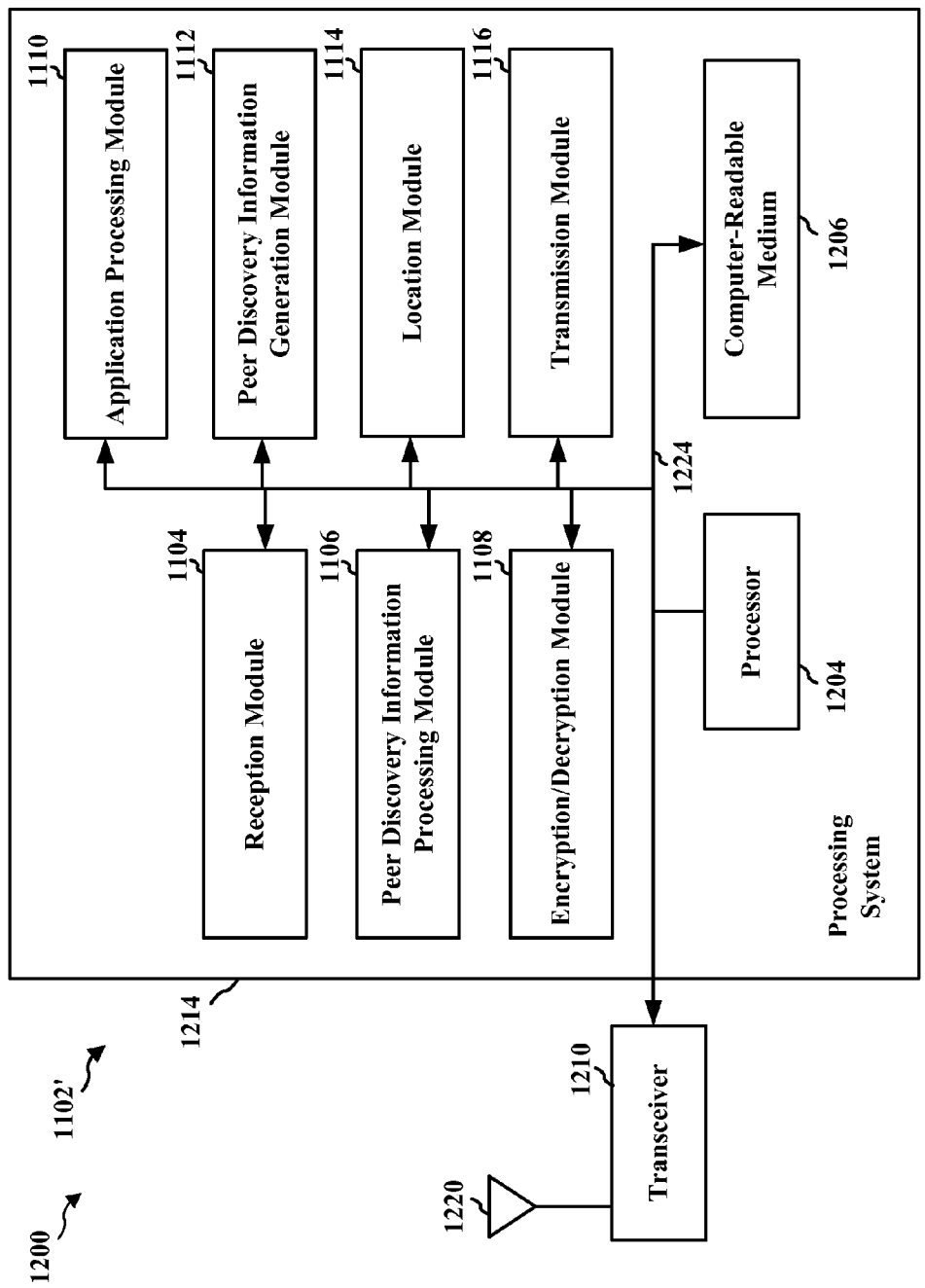
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, 1116, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1112, 1114, and 1116. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for internally receiving, from an application, a request to announce an expression, means for generating PD information including the expression information and the location information, and means for announcing the PD information. In an aspect, the expression may be associated with expression information to be announced over the air. In an aspect, the request may include an indication to provide location information with the expression information during announcement. In an aspect, the location information may be included along with the expression information in a data section of the PD information. In an aspect, the apparatus 1102/1102' means for generating may be further configured to encode the expression information with a secret discovery expression-code, and encode the location information with a secret location expression-code. In such an aspect, the secret discovery expression-code may be different than the secret location expression-code. In another aspect, the apparatus 1102/1102' means for generating may further be configured to include a location information indication in a header section of the PD information. In another aspect, the apparatus 1102/1102' means for generating may be further configured to truncate latitude and longitude data based on a range of announcement for the expression-code.

In another configuration, the apparatus 1102/1102' for wireless communication includes means for receiving PD information from an announcing UE, means for determining that the PD information includes expression information and location information, and means for extracting the expression information and the location information from the PD information. In an aspect, the apparatus 1102/1102' may further include means for internally sending an expression based on the expression information and the location information to one or more applications. In an aspect, the apparatus 1102/1102' means for extracting may be further configured to use a secret discovery expression-code to decode the private expression, and use a secret location expression-code to decode the location information. In such an aspect, the secret discovery expression-code is different than the secret location expression-code. Further, in such an aspect, the apparatus 1102/1102' means for receiving may further be configured to receive opaque UE information including the secret discovery expression-code and the secret location expression-code. In an aspect, the apparatus 1102/1102' means for extracting may be further configured to generate full latitude and longitude data from partial latitude and longitude data. In an aspect, the apparatus 1102/1102' means for extracting may be further configured to determine freshness of location information based on a timing delta between a reading time and a reception time.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" and/or "one or more of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications of a first user equipment (UE), comprising:
   receiving, from an application, a request to announce an expression, wherein the expression is associated with expression information to be announced over the air, and wherein the request includes an indication to provide location information with the expression information during announcement, the location information including a time value to allow a receiving UE to determine freshness of the location information based on a timing difference between a location reading time and a transmission time;
   generating peer discovery (PD) information including the expression information and the location information, wherein the location information is included along with the expression information in a data section of the PD information, wherein the location information comprises a partial latitude and longitude data in which a common portion of full latitude and longitude data of the first UE and the receiving UE is truncated, the common portion being based on a peer discovery range for the PD information; and
   announcing the PD information.

2. The method of claim 1, wherein the generating further comprises including a location information indication in a header section of the PD information.

3. The method of claim 1, wherein the receiving UE is within the range of announcement for the PD information.

4. The method of claim 3, wherein the location information further includes altitude data.

5. The method of claim 4, wherein the altitude data is provided in an enumerated type describing build floor increments.

6. The method of claim 1, wherein the location information includes a venue code.

7. The method of claim 1, wherein the location information includes location accuracy data.

8. A method of communications of a receiving user equipment (UE), comprising:
   receiving peer discovery (PD) information from an announcing UE, the PD information received at a reception time;
   determining that the PD information includes expression information and location information, wherein the location information comprises a location reading time and a partial latitude and longitude data in which a common portion of full latitude and longitude data of the announcing UE and the receiving UE is truncated, the common portion being based on a peer discover range for the PD information; and
   extracting the expression information and the location information from the PD information, the extracting further comprising determining freshness of said location information based on a timing difference between the location reading time and the reception time.

9. The method of claim 8, further comprising:
   sending an expression based on the expression information and the location information to one or more applications.

10. The method of claim 8, wherein the location information is determined to be included in the PD information based on a location information indication in a header section of the PD information.

11. The method of claim 8, wherein the extracting comprises:
    generating the full latitude and longitude data from the partial latitude and longitude data.

12. The method of claim 11, wherein the location information further includes altitude data.

13. The method of claim 12, wherein the altitude data is provided in an enumerated type describing build floor increments.

14. The method of claim 8, wherein the location information further comprises at least one of: a venue code, or location accuracy data.

15. An apparatus for wireless communication, the apparatus being a first user equipment (UE), comprising:
    means for receiving, from an application, a request to announce an expression, wherein the expression is associated with expression information to be announced over the air, and wherein the request includes an indication to provide location information with the expression information during announcement, the location information including a time value to allow a receiving UE to determine freshness of the location information based on a timing difference between a location reading time and a transmission time;

means for generating peer discovery (PD) information including the expression information and the location information, wherein the location information is included along with the expression information in a data section of the PD information, wherein the location information comprises a partial latitude and longitude data in which a common portion of full latitude and longitude data of the first UE and the receiving UE is truncated, the common portion being based on; and means for announcing the PD information.

16. The apparatus of claim 15, wherein the means for generating is further configured to include a location information indication in a header section of the PD information.

17. The apparatus of claim 15, wherein the receiving UE is within the range of announcement for the PD information.

18. The apparatus of claim 17, wherein the location information further includes altitude data.

19. The apparatus of claim 18, wherein the altitude data is provided in an enumerated type describing build floor increments.

20. The apparatus of claim 15, wherein the location information includes a venue code.

21. The apparatus of claim 15, wherein the location information includes location accuracy data.

22. An apparatus for communications of a receiving user equipment (UE), comprising:

means for receiving peer discovery (PD) information from an announcing UE, the PD information received at a reception time;

means for determining that the PD information includes expression information and location information, wherein the location information comprises a location reading time and a partial latitude and longitude data in which a common portion of full latitude and longitude data of the announcing UE and the receiving UE is truncated, the common portion being based on a peer discovery range for the PD information; and means for extracting the expression information and the location information from the PD information, the extracting further comprising determining freshness of said location information based on a timing difference between the location reading time and the reception time.

23. The apparatus of claim 22, further comprising:

means for sending an expression based on the expression information and the location information to one or more applications.

24. The apparatus of claim 22, wherein the location information is determined to be included in the PD information based on a location information indication in a header section of the PD information.

25. The apparatus of claim 22, wherein the means for extracting is further configured to:

generate the full latitude and longitude data from the partial latitude and longitude data.

26. The apparatus of claim 25, wherein the location information further includes altitude data.

27. The apparatus of claim 26, wherein the altitude data is provided in an enumerated type describing build floor increments.

28. The apparatus of claim 22, wherein the location information further comprises at least one of: a venue code, or location accuracy data.

29. An apparatus for wireless communication, the apparatus being a first user equipment (UE), comprising:

a memory; and at least one processor coupled to the memory and configured to:

receive, from an application, a request to announce an expression, wherein the expression is associated with expression information to be announced over the air, and wherein the request includes an indication to provide location information with the expression information during announcement, the location information including a time value to allow a receiving UE to determine freshness of the location information based on a timing difference between a location reading time and a transmission time;

generate peer discovery (PD) information including the expression information and the location information, wherein the location information is included along with the expression information in a data section of the PD information, wherein the location information comprises a partial latitude and longitude data in which a common portion of full latitude and longitude data of the first UE and the receiving UE is truncated, the common portion being based on a peer discovery range for the PD information; and announce the PD information.

30. The apparatus of claim 29, wherein the at least one processor is further configured to include a location information indication in a header section of the PD information.

31. The apparatus of claim 29, wherein the receiving UE is within the range of announcement for the PD information.

32. The apparatus of claim 31, wherein the location information further includes altitude data.

33. The apparatus of claim 32, wherein the altitude data is provided in an enumerated type describing build floor increments.

34. The apparatus of claim 29, wherein the location information includes a venue code.

35. The apparatus of claim 29, wherein the location information includes location accuracy data.

36. An apparatus for wireless communication of a receiving user equipment (UE), comprising:

a memory; and at least one processor coupled to the memory and configured to:

receive peer discovery (PD) information from an announcing UE, the PD information received at a reception time;

determine that the PD information includes expression information and location information, wherein the location information comprises a location reading time and a partial latitude and longitude data in which a common portion of full latitude and longitude data of the announcing UE and the receiving UE is truncated, the common portion being based on a peer discovery range for the PD information; and extract the expression information and the location information from the PD information, the extracting further comprising determining freshness of said location information based on a timing difference between the location reading time and the reception time.

37. The apparatus of claim 36, wherein the at least one processor is further configured to:

send an expression based on the expression information and the location information to one or more applications.

38. The apparatus of claim 36, wherein the location information is determined to be included in the PD information based on a location information indication in a header section of the PD information.

39. The apparatus of claim 36, wherein the at least one processor is further configured to generate the full latitude and longitude data from the partial latitude and longitude data.

40. The apparatus of claim 39, wherein the location information further includes altitude data.

41. The apparatus of claim 40, wherein the altitude data is provided in an enumerated type describing build floor increments.

42. The apparatus of claim 36, wherein the location information further comprises at least one of: a venue code, or location accuracy data.

43. A non-transitory computer-readable medium storing computer executable code, comprising code for:
receiving, from an application, a request to announce an expression, wherein the expression is associated with expression information to be announced over the air, and wherein the request includes an indication to provide location information of a first user equipment (UE) with the expression information during announcement, the location information including a time value to allow a receiving UE to determine freshness of the location information based on a timing difference between a location reading time and a transmission time;
generating peer discovery (PD) information including the expression information and the location information, wherein the location information is included along with the expression information in a data section of the PD information, wherein the location information comprises a partial latitude and longitude data in which a common portion of full latitude and longitude data of the first UE and the receiving UE is truncated, the common portion being based on peer discovery range for the PD information; and
announcing the PD information.

44. The non-transitory computer-readable medium of claim 43, further comprising code for including a location information indication in a header section of the PD information.

45. The non-transitory computer-readable medium of claim 43, wherein the second receiving UE is within the range of announcement for the PD information.

46. The non-transitory computer-readable medium of claim 45, wherein the location information further includes altitude data.

47. The non-transitory computer-readable medium of claim 46, wherein the altitude data is provided in an enumerated type describing build floor increments.

48. The non-transitory computer-readable medium of claim 43, wherein the location information includes a venue code.

49. The non-transitory computer-readable medium of claim 43, wherein the location information includes location accuracy data.

50. A non-transitory computer-readable medium storing computer executable code, comprising code for:
receiving, at a receiving user equipment (UE), peer discovery (PD) information from an announcing UE, the PD information received at a reception time;
determining that the PD information includes expression information and location information, wherein the location information comprises a location reading time and a partial latitude and longitude data in which a common portion of full latitude and longitude data of the announcing UE and the receiving UE is truncated, the common portion being based on a peer discovery range for the PD information; and
extracting the expression information and the location information from the PD information, the location information including a location reading time, and further comprising code for determining freshness of said location information based on a timing difference between the location reading time and the reception time.

51. The non-transitory computer-readable medium of claim 50, further comprising code for:
sending an expression based on the expression information and the location information to one or more applications.

52. The non-transitory computer-readable medium of claim 50, wherein the location information is determined to be included in the PD information based on a location information indication in a header section of the PD information.

53. The non-transitory computer-readable medium of claim 50, wherein the code for extracting is configured to:
generate the full latitude and longitude data from the partial latitude and longitude data.

54. The non-transitory computer-readable medium of claim 53, wherein the location information further includes altitude data.

55. The non-transitory computer-readable medium of claim 54, wherein the altitude data is provided in an enumerated type describing build floor increments.

56. The non-transitory computer-readable medium of claim 50, wherein the location information further comprises at least one of: a venue code, or location accuracy data.

* * * * *